(12) United States Patent
Lin et al.

(10) Patent No.: US 7,951,859 B2
(45) Date of Patent: May 31, 2011

(54) COMPOSITION WITH ENHANCED HEAT RESISTANCE PROPERTY

(75) Inventors: Thomas S. Lin, Whippany, NJ (US); Jeffrey M. Cogen, Flemington, NJ (US)

(73) Assignee: Union Carbide Chemicals & Plastics Technology LLC, Wilmington, DE (US)

( * ) Notice: Subject to any disclaimer, the term of this patent is extended or adjusted under 35 U.S.C. 154(b) by 0 days.

(21) Appl. No.: 12/841,446

(22) Filed: Jul. 22, 2010

(65) Prior Publication Data

US 2010/0282490 A1 Nov. 11, 2010

Related U.S. Application Data

(63) Continuation of application No. 11/002,777, filed on Nov. 30, 2004.

(51) Int. Cl.
*C08K 5/3492* (2006.01)
*C08K 5/42* (2006.01)
*C08K 5/25* (2006.01)

(52) U.S. Cl. ......... 524/100; 524/191; 524/292; 524/323

(58) Field of Classification Search .................. None
See application file for complete search history.

(56) References Cited

U.S. PATENT DOCUMENTS

| | | | |
|---|---|---|---|
| 4,338,244 A * | 7/1982 | Hinsken et al. | 524/109 |
| 4,343,733 A * | 8/1982 | Maringer et al. | 524/87 |
| 4,721,531 A | 1/1988 | Wildeman et al. | |
| 4,857,600 A | 8/1989 | Gross et al. | |
| 5,225,468 A | 7/1993 | Biggs | |
| 5,718,974 A | 2/1998 | Kmiec | |
| 5,955,525 A | 9/1999 | Sanchez et al. | |
| 6,080,929 A | 6/2000 | Fagouri et al. | |
| 6,197,864 B1 | 3/2001 | Borke et al. | |
| 6,277,907 B1 | 8/2001 | Gelbin | |
| 6,441,309 B1 | 8/2002 | Jow et al. | |
| 6,565,779 B1 | 5/2003 | Kharazi | |
| 6,565,784 B1 | 5/2003 | Esseghir et al. | |
| 6,670,554 B1 | 12/2003 | Jow et al. | |
| 6,720,383 B2 | 4/2004 | Barclay et al. | |
| 2002/0193472 A1 | 12/2002 | Jancis | |
| 2003/0181563 A1 | 9/2003 | Heinz et al. | |

FOREIGN PATENT DOCUMENTS

| | | |
|---|---|---|
| GB | 1593902 | 7/1981 |
| GB | 2252324 | 8/1992 |

OTHER PUBLICATIONS

Muller, Helmut Dr., "Kunststoff-Additive (3. Ausgabe)", 1989, Carl Hanser Verlag, Munich, Germany.

* cited by examiner

*Primary Examiner* — Kriellion A Sanders
(74) *Attorney, Agent, or Firm* — Whyte Hirschboeck Dudek SC

(57) ABSTRACT

Compositions including a polymer, a primary antioxidant, a secondary antioxidant, and a metal deactivator selected from at least one of 2,2'-oxamido bis[ethyl 3-(3,5-di-tert-butyl-4-hydroxyphenyl)propionate] and oxalyl bis(benzylidenehydrazide), are disclosed. The compositions can also include a light stabilizer. The compositions can be used to manufacture insulations for wire and cable. The compositions have improved long-term heat aging and also retain their color when exposed to heat. A method of making an insulation for a conductor, such as a wire or a cable, made from a composition is also provided.

17 Claims, No Drawings

COMPOSITION WITH ENHANCED HEAT RESISTANCE PROPERTY

CROSS REFERENCE TO RELATED APPLICATION

This application is a continuation application of U.S. Ser. No. 11/002,777 filed on Nov. 30, 2004, the contents of which are herein incorporated by reference in its entirety.

FIELD OF THE INVENTION

The invention relates to compositions for protecting or insulating metallic objects and more particularly, to compositions for use in insulated cables and wires.

DESCRIPTION OF THE RELATED ART

Cables and wires are extensively used in making cars, trucks, and other vehicles. Such cables and wires are exposed to high temperatures for long periods of time and therefore, require insulations having good heat aging performance.

Stabilizing cable insulation for long-term heat stability is very challenging when the insulation is in contact with a copper wire. Heat generated under the hood and around the engine compartment can cause accelerated degradation of one or more of the polymers used in the insulation on the copper wire. In the automotive cable industry, there is a growing trend to require the automotive cable insulation to pass long-term heat aging at a rated temperature. For example, ISO-6722:200 2 (E) or LV-112:17.10.2001 each requires 3000 hour heat aging at 125° C. and 240 hour heat aging @ 150° C. for a Class C automotive cable. In addition, copper not only generates heat, it catalyzes degradation of polymers used in insulation. Other metals, such as aluminum, also catalyze degradation of polymers, but typically with a much slower rate than copper does.

Previous insulations for automotive cables have comprised various antioxidants. For example, an antioxidant package consisting of one or more hindered phenols and a pentaerythritol betaalkylthiopropionate (Seenox® 412S) has been used to provide good heat resistance stability and nondiscoloration of copper conductors. In addition, a combination of two antioxidants, a hindered phenol, and a zinc-mercapto toluimidazole salt has been used for wire and cable insulation. Although these previous insulations exist, there is still a general industry desire for improved heat resistance performance of wire and cable insulation.

In view of the foregoing, a composition with improved long-term heat aging, heat resistance performance, and color retention would be desirable. An insulation for a wire or a cable, the insulation having the above characteristics would also be desirable, as well as methods of making the insulations.

SUMMARY OF THE INVENTION

The invention, which is defined by the claims set out at the end of this disclosure, is intended to solve at least some of the problems noted above. A composition is provided that comprises a polymer, a primary antioxidant, a secondary antioxidant, and a metal deactivator selected from at least one of 2,2'-oxamido bis[ethyl 3-(3,5-di-tert-butyl-4-hydroxyphenyl)propionate] and oxalyl bis(benzylidenehydrazide). In one embodiment, the primary antioxidant is a hindered phenol. In another embodiment, the secondary antioxidant is a thiosynergist. A hindered amine light stabilizer can also be included in the composition. The metal deactivator, primary antioxidant, secondary antioxidant, and optional hindered amine light stabilizer stabilize the polymer such that the composition has long-term heat resistance and retention of color.

Also provided is insulation for a wire or a cable. The insulation comprises a composition that includes a polymer, a primary antioxidant, a secondary antioxidant, and a metal deactivator selected from at least one of 2,2'-oxamido bis [ethyl 3-(3,5-di-tert-butyl-4-hydroxyphenyl)propionate] and oxalyl bis(benzylidenehydrazide). In one embodiment, the primary antioxidant is a hindered phenol. In another embodiment, the secondary antioxidant is a thiosynergist. An optional light stabilizer can be added to the composition.

A method of making an insulation is also provided. A polymer, a primary antioxidant, a secondary antioxidant, and a metal deactivator selected from at least one of 2,2'-oxamido bis[ethyl 3-(3,5-di-tert-butyl-4-hydroxyphenyl)propionate] and oxalyl bis(benzylidenehydrazide) are blended. The composition is formed into a desired shape around a conductor, such as a wire or a cable. The formed composition may be crosslinked.

Before explaining embodiments of the invention in detail, it is to be understood that the following detailed description describes specific embodiments in which the invention may be practiced. These embodiments are described in sufficient detail to enable those skilled in the art to practice the invention. It is to be understood that other embodiments may be used and that structural, logical, and other changes may be made without departing from the spirit and scope of the present invention.

DETAILED DESCRIPTION

One aspect of the present invention is a composition comprising a polymer, a primary antioxidant, a secondary antioxidant, and a metal deactivator. In an embodiment of the invention, the primary antioxidant comprises a hindered phenol. In another embodiment of the invention, the secondary antioxidant comprises a thiosynergist.

The inventors have found that two metal deactivators surprisingly work better than 1,2-Bis(3,5-di-tert-butyl-4-hydroxyhydrocinnamoyl)hydrazine (CAS 32687-78-8), commercially available from Ciba Specialty Chemicals, Tarrytown, N.Y., as Irganox® 1024, an industry standard, in stabilizing the polymer for long-term heat aging and retaining the color of composition. The first metal deactivator is 2,2'-oxamido bis[ethyl 3-(3,5-di-tert-butyl-4-hydroxyphenyl) propionate] (CAS 70331-94-1), commercially available from Crompton Corporation-Uniroyal Chemical, Middlebury, Conn. as Naugard® XL-1 and will herein also be referred to as XL-1. The second metal deactivator is Oxalyl bis(benzylidenehydrazide) (CAS 6629-10-3), commercially available from Eastman Chemical Company, Kingsport, Tenn. as OABH. The inventors have also found that adding a light stabilizer to the composition can significantly improve heat resistance stability.

These benefits are particularly important when the composition comes into contact with copper wire, other heat sources, or other materials that catalyze degradation of polymers. Insulations for wires and cables, such as automotive cables, and other products produced with the composition have improved long-term heat aging performance. For example, compositions made in accordance with the invention meet the standard of 3000 hours at 125° C. according to the ISO 6722:200 2 (E).

The compositions are especially useful in the manufacture of insulations for automotive wire and cables. The composition can also be used for other applications where good heat resistance is required for compositions in contact with heat generating materials, such as copper.

Polymers that can be used in the invention include any polymer usable for cable or wire insulations. Such polymers preferably have resistance to cutting and abrasion, are flexible, and preferably are at least slightly elastic. The polymer should be a thermoplastic to facilitate forming the insulation but, in some preferred embodiments, the polymer will subsequently be cross-linked. Typical polymers include polyolefins, thermoplastic elastomer (TPE), a thermoplastic olefin (TPO), a thermoplastic vulcanizate (TPV), or blends of these polymers. Polymers are commercially available from many sources. Both crosslinkable polymers and polymers that are not crosslinkable and combinations thereof can be used in the invention. Where non-crosslinkable polymers are used, they are used in combination with crosslinkable ones to provide crosslinking of at least a portion of the polymers.

The crosslinkable thermoplastic polymer is preferably a polyolefin. Suitable polyolefins include ethylene polymers, propylene polymers, and blends thereof.

Ethylene polymer, as that term is used herein, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture or blend of such homopolymers and copolymers. The mixture can be a mechanical blend or an in situ blend. Examples of the alpha-olefins are propylene, 1-butene, 1-hexene, 4-methyl-1-pentene, and 1-octene. The polyethylene can also be a copolymer of ethylene and an unsaturated ester such as a vinyl ester (for example, vinyl acetate or an acrylic or methacrylic acid ester), a copolymer of ethylene and an unsaturated acid such as acrylic acid, or a copolymer of ethylene and a vinyl silane (for example, vinyltrimethoxysilane and vinyltriethoxysilane).

The polyethylene can be homogeneous or heterogeneous. The homogeneous polyethylenes usually have a polydispersity (Mw/Mn) in the range of 1.5 to 3.5 and an essentially uniform comonomer distribution, and are characterized by a single and relatively low melting point as measured by a differential scanning calorimeter. The heterogeneous polyethylenes usually have a polydispersity (Mw/Mn) greater than 3.5 and lack a uniform comonomer distribution. Mw is defined as weight average molecular weight, and Mn is defined as number average molecular weight.

The polyethylenes can have a density in the range of 0.860 to 0.965 gram per cubic centimeter, and preferably have a density in the range of 0.870 to 0.955 gram per cubic centimeter. They also can have a melt index in the range of 0.1 to 50 grams per 10 minutes. If the polyethylene is a homopolymer, its melt index is preferably in the range of 0.75 to 3 grams per 10 minutes. Melt index is determined under ASTM D-1238, Condition E and measured at 190 degree C. and 2160 grams.

Low- or high-pressure processes can produce the polyethylenes. They can be produced in gas phase processes or in liquid phase processes (that is, solution or slurry processes) by conventional techniques. Low-pressure processes are typically run at pressures below 1000 pounds per square inch ("psi") whereas high-pressure processes are typically run at pressures above 15,000 psi.

Typical catalyst systems for preparing these polyethylenes include magnesium/titanium-based catalyst systems, vanadium-based catalyst systems, chromium-based catalyst systems, metallocene catalyst systems, and other transition metal catalyst systems. Many of these catalyst systems are often referred to as Ziegler-Natta catalyst systems or Phillips catalyst systems. Useful catalyst systems include catalysts using chromium or molybdenum oxides on silica-alumina supports.

Useful polyethylenes include low density homopolymers of ethylene made by high pressure processes (HP-LDPEs), linear low density polyethylenes (LLDPEs), very low density polyethylenes (VLDPEs), ultra low density polyethylenes (ULDPEs), medium density polyethylenes (MDPEs), high density polyethylene (HDPE), and metallocene copolymers.

High-pressure processes are typically free radical initiated polymerizations and conducted in a tubular reactor or a stirred autoclave. In the tubular reactor, the pressure is within the range of 25,000 to 45,000 psi and the temperature is in the range of 200 to 350 degree C. In the stirred autoclave, the pressure is in the range of 10,000 to 30,000 psi and the temperature is in the range of 175 to 250 degree C.

The preferred polymers are copolymers comprised of ethylene and unsaturated esters or acids, which are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 5 to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids.

The melt index of the ethylene/unsaturated ester copolymers or ethylene/unsaturated acid copolymers can be in the range of 0.5 to 50 grams per 10 minutes, and is preferably in the range of 2 to 25 grams per 10 minutes.

Copolymers of ethylene and vinyl silanes may also be used. Examples of suitable silanes are vinyltrimethoxysilane and vinyltriethoxysilane. Such polymers are typically made using a high-pressure process. Use of such ethylene vinylsilane copolymers is desirable when a moisture crosslinkable composition is desired. Optionally, a moisture crosslinkable composition can be obtained by using a polyethylene grafted with a vinylsilane in the presence of a free radical initiator. When a silane-containing polyethylene is used, it may also be desirable to include a crosslinking catalyst in the formulation (such as dibutyltindilaurate or dodecylbenzenesulfonic acid) or another Lewis or Bronsted acid or base catalyst.

The VLDPE or ULDPE can be a copolymer of ethylene and one or more alpha-olefins having 3 to 12 carbon atoms and preferably 3 to 8 carbon atoms. The density of the VLDPE or ULDPE can be in the range of 0.870 to 0.915 gram per cubic centimeter. The melt index of the VLDPE or ULDPE can be in the range of 0.1 to 20 grams per 10 minutes and is preferably in the range of 0.3 to 5 grams per 10 minutes. The portion of the VLDPE or ULDPE attributed to the comonomer(s), other than ethylene, can be in the range of 1 to 49 percent by weight based on the weight of the copolymer and is preferably in the range of 15 to 40 percent by weight.

A third comonomer can be included, for example, another alpha-olefin or a diene such as ethylidene norbornene, butadiene, 1,4-hexadiene, or a dicyclopentadiene. Ethylene/propylene copolymers are generally referred to as EPRs and ethylene/propylene/diene terpolymers are generally referred to as an EPDM. The third comonomer can be present in an amount of 1 to 15 percent by weight based on the weight of the copolymer and is preferably present in an amount of 1 to 10 percent by weight. It is preferred that the copolymer contains two or three comonomers inclusive of ethylene.

The LLDPE can include VLDPE, ULDPE, and MDPE, which are also linear, but, generally, has a density in the range of 0.916 to 0.925 gram per cubic centimeter. It can be a copolymer of ethylene and one or more alpha-olefins having 3 to 12 carbon atoms, and preferably 3 to 8 carbon atoms. The melt index can be in the range of 1 to 20 grams per 10 minutes, and is preferably in the range of 3 to 8 grams per 10 minutes.

Any polypropylene may be used in these compositions. Examples include homopolymers of propylene, copolymers of propylene and other olefins, and terpolymers of propylene, ethylene, and dienes (for example, norbornadiene and decadiene). Additionally, the polypropylenes may be dispersed or blended with other polymers such as EPR or EPDM. Examples of polypropylenes are described in Polypropylene Handbook: Polymerization, Characterization, Properties, Processing, Applications 3-14, 113-176 (E. Moore, Jr. ed., 1996).

Suitable polypropylenes may be components of TPEs, TPOs and TPVs. Those polypropylene-containing TPEs, TPOs, and TPVs can be used in this application.

Both non-metallocene and metallocene can be used as polymers in the invention. Metallocene polymers can be used to balance mechanical properties of the insulation.

Primary antioxidants mainly act as chain-breaking antioxidants and react rapidly with peroxy and other radicals. Examples of primary antioxidants include compounds with reactive OH or NH groups. Inhibition occurs via a transfer of a hydrogen from the reactive OH/NH group to a reactive free radical. The resulting radical formed from the antioxidant is relatively stable and does not abstract a hydrogen from a polymer chain. Primary antioxidants include hindered phenols and hindered amines.

Hindered phenols are primary antioxidants that act as hydrogen donors. Hindered phenols react with peroxy radicals to form hydroperoxides to prevent the abstraction of hydrogen from the polymer backbone. Hindered phenols suitable for use in the invention include Irganox® 1010 ((pentaerythrityl-tetrakis[3-(3,5-di-tert-butyl-4-hydroxyphenyl) propionate]) (CAS 6683-19-8); Irganox® 1076 (octadecyl-3-(3,5-di-tert-butyl-4-hydroxyphenyl) propionate (CAS 2082-79-3)); Irganox® 1330 (1,3,5-trimethyl-2,4,6-tris(3,5-di-tert-butyl-4-hydroxybenzyl)benzene (CAS 1709-70-2)); Irganox® 3114 ((tris(3,5-di-tert-butyl-4-hydroxybenzyl)isocyanurate) (CAS 27676-62-6)), Secondary antioxidants react with hydroperoxides to yield non-radical, non-reactive products, and thermally stable products. Secondary antioxidants are frequently called hydroperoxide decomposers. When primary and secondary antioxidants are used together, they yield synergistic stabilization effects. Secondary antioxidants include phosphites, hindered amines, and thiosynergists.

Thiosynergist are sulphur-based secondary antioxidants that decompose hydroperoxides. The most common commercially available thiosynergists are based on either lauric or stearic acid. Thiosynergists that can be used in the invention include: (1) Seenox® 412S (Pentaerythritol tetrakis(B-laurylthiopropionate) (CAS 29598-76-3)), (2) distearyl-3,3'-thiodipropionate CAS 693-36-7) such as Naugard® DSTDP (commercially available from Crompton Corporation-Uniroyal Chemical, Middlebury, Conn.), Lowinox® DSTDP (commercially available from Great Lakes Chemical Corporation, Indianapolis, Ind.), Cyanox SDTP (commercially available from Cytec Industries Inc., Stamford, Conn.), and Irganox® PS 802 (commercially available from Ciba Specialty Chemicals Inc., Terrytown, N.Y.), (3) Dilauryl-3,3'-thiodipropionate (CAS 123-28-4) such as Naugard® DLTDP, Lowinox® DLTDP, Cyanox LDTP, and Irganox® PS800. Metal deactivators suppress the catalytic action of metal surfaces and traces of metallic materials. Metal deactivators convert the traces of metal and metal surfaces into an inactive form. This is beneficial because metal ions may contribute to accelerated degradation of, e.g., polymers that come into contact with metals, such as copper wire.

Other examples of primary and secondary antioxidants, as well metal deactivators, are well known to those skilled in the art, and some can be found in "Plastics Additives Handbook: Stabilizers, Processing AIDS, Plasticizers, Fillers, Reinforcements, Colorants for Thermoplastics" by H. Muller, P. P. Klemchuk, R. Gachter, Peter P. Klemchuk, H. Andreas, Hanser Gardner Publications, 1993 (ISBN: 1569901538).

The inventors have found that surprisingly two metal deactivators work better than 1,2-Bis(3,5-di-tert-butyl-4-hydroxyhydrocinnamoyl)hydrazine (CAS 32687-78-8), commercially available from Ciba Specialty Chemicals, Tarrytown, N.Y., as Irganox® 1024, an industry standard, in stabilizing the polymer for long-term heat aging and retaining the color of composition. The first metal deactivator is 2,2'-oxamido bis[ethyl 3-(3,5-di-tert-butyl-4-hydroxyphenyl) propionate] (CAS 70331-94-1), commercially available from Crompton Corporation-Uniroyal Chemical, Middlebury, Conn. as Naugard® XL-1 and will herein also be referred to as XL-1. The second metal deactivator is Oxalyl bis(benzylidenehydrazide) (CAS 6629-10-3), commercially available from Eastman Chemical Company, Kingsport, Tenn. as OABH. OABH is a copper deactivator that provides excellent stability for polymers such as polypropylene and polyethylene. OABH functions by chelating/deactivating various copper salts that would otherwise cause the oxidation of polymers.

The inventors have also found that adding a hindered amine light stabilizer (HALS) to the composition can significantly improve heat resistance stability. HALS work by stabilizing organic materials against deleterious effects of UV radiation. Exemplary HALS include, but are not limited to, Chimassorb 2020 (CAS 192268-64-7). Additional HALS that can be used in the compositions are described in, e.g., U.S. Pat. No. 4,721, 531, which is incorporated herein by reference. Hindered amine light stabilizers may, for example, be derivatives of 2,2,6,6-tetraalkyl piperidines or substituted piperizinediones. A number of HALS useful in the composition are available commercially such as from Ciba Speciality Chemical Inc. Corporation under the general trade designations Tinuvin and Chimassorb, and from Cytec under the general designation Cyasorb-UV. Examples include Tinuvin 111 (a mixture of 1,3,5-Triazine-2,4,6-triamine, N,N'-[1,2-ethanediylbis[[[4, 6-bis[butyl(1,2,2,6,6-pentamethyl-4-piperidiny 1)amino]-1, 3,5-triazin-2-yl]imino]-3,1propanediyl]]-bis[N,N'-dibutyl-N,N'-bis(1,2,2,6,6-pentamethyl-4-piperidinyl)-and dimethyl succinate polymer with 4-hydroxy-2,2,6,6-tetramethyl-1-piperidineethanol); Tinuvin 123 (bis-(1-octyloxy-2,2,6,6-tetramethyl-4-piperidinyl)sebacate); Tinuvin 770 (bis-(2,2,6,6-tetramethyl-4-piperidinyl)-sebacate); Tinuvin 765 (bis-(1,2, 2,6,6-pentamethyl-4-piperidinyl)-sebacate); Tinuvin 622 (a dimethyl succinate polymer with 4-hydroxy-2,2,6,6-tetramethyl-1-piperidineethanol); and Chimassorb 944 (poly[[6-(1, 1,3,3-tetramethylbutyl)amino]-1,3,5-triazine-2,4-diyl][[2,2, 6,6-tetramethyl-4-piperidyl)imino]]he xamethylene(2,2,6,6-tetramethyl-4-piperidyl)imino]]), and Chimassorb 119 (1,3, 5-Triazine-2,4,6-triamine-N,N'-[1,2-ethanediylbis[[[4,6-bis [butyl(1,2,2,6,6-pentamethyl-4-peperidinyl)amino]-1,3,5-triazin-2-yl]imino]-3,1 propanediyl]]-bis[N,N'-dibutyl-N, N'-bis(1,2,2,6,6-pentamethyl-4-piperidinyl); and Chimassorb 2020 (CAS 192268-64-7)

Additional ingredients, such as flame retardants (e.g. aluminum hydroxide, which is also known an aluminum trihydrate), fillers, processing aids, metal oxide (e.g., zinc oxide), cure coagent (e.g., 1,3-propanediol, 2-ethyl-2-hydroxymethyl-, trimethacrylate (CAS 3290-92-4), available from Sartomer Company, Inc., Exton, Pa. as Sartomer SR 350), coupling agent (e.g., vinyltriethoxysilane, zinc stearate), and peroxide (e.g., alpha, alpha'-bis (t-butylperoxy) diisopropylbenzene), can also be included in the composition.

In one embodiment, the hindered phenol and the thiosynergist are Irganox® 1010 and Seenox® 412S, respectively. An exemplary combination of a metal deactivator, a hindered phenol, and a thiosynergist is XL-1, Irganox® 1010, and Seenox® 412S. An exemplary combination of a metal deactivator, a hindered phenol, a thiosynergist, and a light stabilizer is OABH, Irganox® 1010, Seenox® 412S, and Chimassorb 2020.

In all of the following embodiments, the ranges are per about 100 parts by weight of the polymer. In an embodiment, the metal deactivator is included at about 0.05 to about 10 parts by weight. In another embodiment, the metal deactivator is included at about 0.2 to about 2 parts by weight. The hindered phenol can be included at about 0.05 to about 10 parts by weight. The hindered phenol can also be included at about 0.2 to about 3 parts by weight. The thiosynergist can be included at about 0.05 to about 30 parts by weight. The thiosynergist can also be included at about 2 to about 5 parts by weight. If included, the light stabilizer can be included at about 0.05 to about 10 parts by weight. If included, the light stabilizer can also be included at about 0.2 to about 3 parts by weight.

The metal deactivator, hindered phenol, and thiosynergist impart good heat resistance to the composition when the composition is in contact with a copper wire under a high heat condition or in contact with any other heat producing source. It was surprisingly found that XL-1 and OABH were more effective than Irganox® 1024, an industry standard, in stabilizing the polymer. It was further found that the addition of a light stabilizer in the composition can significantly improve heat resistance stability.

The compositions of this invention are typically made by blending the polymer, the metal deactivator, the primary antioxidant, and the secondary antioxidant. The optional light stabilizer can also be added and blended with the other ingredients of the composition. The composition can be made in a master mix or in a compounder. Compounding is described in U.S. Pat. No. 6,565,784, which is incorporated herein by reference.

The composition can be used in wire and cable insulations and other articles requiring good heat resistance and/or non-discoloration. In most end use applications, the composition can be formed into the desired final shape, e.g., by extrusion or molding, as is detailed below. After the composition is formed, it can be crosslinked. In crosslinking the composition, adjacent chains of the polymer are joined by covalent bonds.

Crosslinking can be effected by irradiation, if desired. The composition can also be crosslinked by adding a crosslinking agent or by making it hydrolyzable, which is accomplished by adding hydrolyzable groups such as $-Si(OR)_3$ wherein R is a hydrocarbyl radical to the polymer structure through grafting or copolymerization process. Exemplary hyrolyzable groups include vinyltrimethoxysilane, vinyltriethoxysilane, and gamma-methacryloxypropyltrimethoxy-silane, which can be grafted to the polymer in the presence of the aforementioned organic peroxides. The hydrolyzable polymers are then crosslinked by moisture in the presence of a silanol condensation catalyst such as dibutyltin dilaurate, dioctyltin maleate, dibutyltin diacetate, stannous acetate, lead naphthenate, and zinc caprylate.

Examples of hydrolyzable grafted copolymers are vinyltrimethoxy silane grafted ethylene homopolymer, vinyltriethoxy silane grafted ethylene homopolymer, and vinyltributoxy silane grafted ethylene homopolymer. An example of hydrolysable silane-ethylene copolymer is Si-Link DFDA-5451 available from The Dow Chemical Company, which is a reactor produced copolymer of ethylene and vinyltrimethoxysilane.

The composition can additionally be crosslinked with free radical initiators such as organic peroxides. Suitable organic peroxides are, e.g., dicumyl peroxide; 2,5-dimethyl-2,5-di(t-butylperoxy)hexane; t-butyl cumyl peroxide; and 2,5-dimethyl-2,5-di (t-butylperoxy)hexane-3. Generally, the organic peroxide is incorporated into the polymer by melt blending in a roll mill, a biaxial screw kneading extruder, or a Banbury™ or Brabender™ mixer at a temperature lower than the onset temperature for significant decomposition of the peroxide. Peroxides are judged for decomposition based on their half life temperatures as described in Plastic Additives Handbook, Gachter et al, 1985, pages 646 to 649. An alternative method for organic peroxide incorporation into a polymeric compound is to mix liquid peroxide and pellets of the polymer in a blending device, such as a Henschel™ mixer or a soaking device such as a simple drum tumbler, which are maintained at temperatures above the freeze point of the organic peroxide and below the decomposition temperature of the organic peroxide and the melt temperature of the polymer. Following the organic peroxide incorporation, the polymer/organic peroxide blend is then, for example, introduced into an extruder where it is extruded around an electrical conductor at a temperature lower than the decomposition temperature of the organic peroxide to form a cable. The cable is then exposed to higher temperatures at which the organic peroxide decomposes to provide free radicals, which crosslink the polymer.

A conductor, such as a wire or a cable, using the composition of the invention can be prepared in various types of extruders, e.g., single or twin screw types. Compounding can be effected in the extruder or prior to extrusion in a conventional mixer such as a Brabender™ mixer or a Banbury™ mixer. A description of a conventional extruder can be found in U.S. Pat. No. 4,857,600, which is incorporated herein in its entirety. A typical extruder has a hopper at its upstream end and a die at its downstream end. The hopper feeds into a barrel, which contains a screw. At the downstream end, between the end of the screw and the die, is a screen pack and a breaker plate.

The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating, where the material is crosslinked with an organic peroxide after extrusion, the die of the crosshead feeds directly into a heating zone, and this zone can be maintained at a temperature in the range of about 130° C. to about 260° C., and preferably in the range of about 170° C. to about 220° C.

Another aspect of the present invention is a jacket for wire and cable. The jacket may be employed as the outer protective coating of a wire or cable. The jacket comprises composition described above. The jacket is typically made by extruding a composition of the invention either directly onto a wire or cable core or onto an insulating layer intermediate between the core and the jacket of this invention. The composition can then be crosslinked by suitable means, as described above.

The patents mentioned in the specification are incorporated herein by reference in their entireties. The present invention is further explained by the following examples, which should not be construed by way of limiting the scope of the present invention. It should be noted that in the following examples, the components of the formulations are given in weight percents, whereas above and in the claims the components are given in parts by weight per about 100 parts by weight of the polymer.

EXAMPLES

Examples 1-4

The formulations of Comparative Sample (CS) A-B and Examples (Ex.) 1-4 were prepared by charging the ingredients to a 250 ml Brabender mixer and melt mixing the ingredients for 3 minutes at about 95-110° C. melt temperature. The Brabender prepared formulations were then pressed into nominal 50 mil plaques and cured under a hydraulic press at 180° C. for 15 minutes. The dogbone test specimens were cut from the plaque, and tensile properties were measured using an Intron machine with pulling speed of 20" per minute.

The formulations of Comparative Sample A-B and Examples 1-4 are shown below in Table 1. Comparative Sample A and Examples 1-2 show that both Irganox® 1024 (used in Comparative Sample A) and OBAH (used Example 2) are not as effective as XL-1 (used in Example 1) to provide heat resistance and polymer color stability when Irganox® 1010 and Cyanox® STDP are used. The enhanced heat resistance of the Example 1 formulation is exemplified by its superior percent tensile elongation at break and superior retained tensile elongation at break. After 14 days in a 180° C. oven, Example 1 had a 57% tensile elongation at break, versus 30% for Comparative Sample A and 12% for Example 2. After 14 days in a 180° C. oven, Example 1 had a 73% retained tensile elongation at break, versus 18% for Comparative Sample A and 6% for Example 2.

For polymer color stability, after 14 days of heat aging at 180° C., the color of the Example 1 formulation remained light, whereas the formulations of Comparative Sample A and Example 2 became dark.

When Cyanox® 1790 and Seenox® 412S are used, Comparative Sample B and Examples 3-4 show that XL-1 (used in Example 3) and OABH (used in Example 4) are more effective than Irganox® 1024 (used in Comparative Sample B) in stabilizing the polymer. The enhanced heat resistance of the Examples 3 and 4 formulations are exemplified by their superior percent tensile elongation at break and superior retained tensile elongation at break. After 14 days in a 180° C. oven, Example 3 had a 90% tensile elongation at break, and Example 4 had a 144% tensile elongation at break, versus 48% for Comparative Sample B. After 14 days in a 180° C. oven, Example 3 had a 80% retained tensile elongation at break, and Example 4 had a 71% retained tensile elongation at break, versus 25% for Comparative Sample B.

For polymer color stability, after 14 days of heat at 180° C., the color of the Example 3 and Example 4 formulations remained light, whereas the formulation of Comparative Sample B was dark.

These experiments show that XL-1 is most effective metal deactivator, while Irganox® 1024 is the least effective metal deactivator.

TABLE 1

| | CS A (40-3) | Ex. 1 (40-4) | Ex. 2 (40-5) | CS B (40-6) | Ex. 3 (40-7) | Ex. 4 (40-8) |
|---|---|---|---|---|---|---|
| | Composition in wt % | | | | | |
| Components | | | | | | |
| EVA Copolymer (18% VA, 2.5 Ml) | 41.82 | 41.82 | 41.82 | 41.82 | 41.82 | 41.82 |
| Aluminum trihydrate | 48.56 | 48.56 | 48.56 | 48.56 | 48.56 | 48.56 |
| Zinc Oxide | 2.22 | 2.22 | 2.22 | 2.22 | 2.22 | 2.22 |
| Sartomer SR 350[1] | 0.84 | 0.84 | 0.84 | 0.84 | 0.84 | 0.84 |
| Irganox ® 1010FF[2] | 0.74 | 0.74 | 0.74 | 0.00 | 0.00 | 0.00 |
| Cyanox ® 1790[3] | 0.00 | 0.00 | 0.00 | 0.74 | 0.74 | 0.74 |
| Irganox ® 1024 FF[4] | 1.00 | 0.00 | 0.00 | 1.00 | 0.00 | 0.00 |
| Naugard ® XL-1[5] | 0.00 | 1.00 | 0.00 | 0.00 | 1.00 | 0.00 |
| OABH[6] | 0.00 | 0.00 | 1.00 | 0.00 | 0.00 | 1.00 |
| Vinyltriethoxysilane | 0.59 | 0.59 | 0.59 | 0.59 | 0.59 | 0.59 |
| Seenox ® 412S[7] | 0.00 | 0.00 | 0.00 | 1.48 | 1.48 | 1.48 |
| Cyanox ® STDP[8] | 1.48 | 1.48 | 1.48 | 0.00 | 0.00 | 0.00 |
| Zinc Stearate | 0.35 | 0.35 | 0.35 | 0.35 | 0.35 | 0.35 |
| VulCup R[9] | 1.40 | 1.40 | 1.40 | 1.40 | 1.40 | 1.40 |
| Copper MB (1% Copper in EVA Copolymer) | 1.00 | 1.00 | 1.00 | 1.00 | 1.00 | 1.00 |
| Total | 100.00 | 100.00 | 100.00 | 100.00 | 100.00 | 100.00 |
| Original Color | Light | Light | Light | Light | Light | Light |
| Color after 14 days heat aging at 180° C. | Dark | Light | Dark | Dark | Light | Light |
| Tensile Elongation @ Break, % | | | | | | |
| Days in Oven @ 180° C. | 40-3 | 40-4 | 40-5 | 40-6 | 40-7 | 40-8 |
| 0 | 169 | 78 | 186 | 182 | 112 | 204 |
| 14 | 30 | 57 | 12 | 48 | 90 | 144 |

TABLE 1-continued

|  | CS A (40-3) | Ex. 1 (40-4) | Ex. 2 (40-5) | CS B (40-6) | Ex. 3 (40-7) | Ex. 4 (40-8) |
|---|---|---|---|---|---|---|
|  |  |  | Composition in wt % |  |  |  |
| Retained Tensile Elongation @ Break, % |  |  |  |  |  |  |
| Days in Oven @ 180° C. | 40-3 | 40-4 | 40-5 | 40-6 | 40-7 | 40-8 |
| 0 | 100 | 100 | 100 | 100 | 100 | 100 |
| 14 | 18 | 73 | 6 | 25 | 80 | 71 |

[1]Sartomer SR 350 is 1,3-propanediol, 2-ethyl-2-hydroxymethyl-, trimethacrylate (CAS 3290-92-4) and can be obtained from Sartomer Company, Inc., Exton, PA.
[2]Irganox ® 1010FF is the free flowing form of Irganox ® 1010 (powder form) and is (pentaerythrityl-tetrakis[3-(3,5-di-tert-butyl-4-hydroxyphenyl) propionate] (CAS 6683-19-8) and can be obtained from Ciba Specialty Chemicals, Tarrytown, NY.
[3]Cyanox ® 1790 is 1,3,5-TRIS(4-tert-butly-3-hydroxy-2,6-dimethyl benzyl)-1,3,5-triazine-2,4,6-(1H,3H,5H)-trione (CAS 40601-76-1) and can be obtained from Cytec Industries, Inc., West Paterson, NJ.
[4]Irganox ® 1024 FF is the free flowing form of Irganox ® 1010 (powder form) and is 1,2-Bis(3,5-di-tert-butyl-4-hydroxyhydrocinnamoyl)hydrazine (CAS 32687-78-8) and can be obtained from Ciba Specialty Chemicals, Tarrytown, NY.
[5]Naugard ® XL-1 is 2,2'-oxamido bis[ethyl 3-(3,5-di-tert-butyl-4-hydroxyphenyl)propionate] (CAS 70331-94-1) and can be obtained from Crompton Corporation, Naugatuck, CT.
[6]OABH is oxalyl bis(benzylidenehydrazide) (CAS 6629-10-3) and can be obtained from Eastman Chemical Company, Kingsport, TN.
[7]Seenox ® 412S is Pentaerythritol tetrakis (B-laurylthioproprionate) and can be obtained from Crompton Corporation, Hahnville, LA.
[8]Cyanox ® STDP is distearylthiodipropionate (CAS 693-36-7) and can be obtained from Cytec Industries, Inc., West Paterson, NJ.
[9]VulCup R is alpha-alpha"-bis(tert-butylperoxy)-diisopropylbenzene and can be obtained from Geo Specialty Chemicals, Ambler, PA.

Examples 5-8

The formulations of Examples 5-8 were prepared by charging the ingredients to a 250 ml Brabender mixer and melt mixing the ingredients for 3 minutes at about 95-110° C. melt temperature. The Brabender prepared formulations were then pressed into nominal 40 mil plaques and cured under a hydraulic press at 180° C. for 15 minutes. The dogbone test specimens were cut from the plaque and tensile properties were measured using an Instron machine with pulling speed of 20" per minute.

The formulations are shown below in Table 2. Comparison of Examples 5 and 8 shows that the formulation containing Seenox® 412S (Example 8) provides better retained tensile elongation and color stability than the formulation containing DSTDP (Example 5). The enhanced heat resistance of the Example 8 formulation is exemplified by its superior percent tensile elongation at break and superior retained tensile elongation at break. After 21 days in a 180° C. oven, Example 8 had a 107% tensile elongation at break, versus 13% for Example 5. After 21 days in a 180° C. oven, Example 8 had a 48% retained tensile elongation at break, versus 13% for Example 5.

For polymer color stability, after 21 days heat at 180° C., the color of the Example 8 formulation was ranked a 4 (dark beige), whereas the formulation of Example 5 was ranked a 6 (brown).

These formulations also show that XL-1 or OABH in combination with Irganox® 1010 and Seenox® 412 S provides better retained tensile elongation and color retention than XL-1 or OABH in combination with Cyanox® 1790 and Seenox® 412 S. The enhanced heat resistance of the Example 8 formulation (Irganox® 1010, XL-1, and OABH) is exemplified by its superior percent tensile elongation at break and superior retained tensile elongation at break when compared to Example 6 (Cyanox® 1790, XL-1, and Seenox® 412S). After 21 days in a 180° C. oven, Example 8 had a 107% tensile elongation at break, versus 22% for Example 6. After 21 days in a 180° C. oven, Example 8 had a 48% retained tensile elongation at break, versus 12% for Example 6.

The enhanced heat resistance of the Example 9 formulation (Irganox® 1010, OABH, and Seenox® 412S) is exemplified by its superior percent tensile elongation at break and superior retained tensile elongation at break when compared to Example 7 (Cyanox® 1790, OABH, and Seenox® 412S). After 21 days in a 180° C. oven, Example 9 had a 69% tensile elongation at break, versus 18% for Example 7. After 21 days in a 180° C. oven, Example 9 had a 35% retained tensile elongation at break, versus 9% for Example 7.

For polymer color stability, after 21 days heat at 180° C., the color of the Examples 6, 8, and 9 formulations were ranked a 4 (dark beige), whereas the formulation of Example 7 was ranked a 5 (light brown).

TABLE 2

|  | Ex. 5 (47-2) | Ex. 6 (47-3) | Ex. 7 (47-4) | Ex. 8 (47-10) | Ex. 9 (47-13) |
|---|---|---|---|---|---|
| Components |  |  |  |  |  |
| EVA Copolymer | 42.32 | 42.32 | 42.32 | 42.32 | 42.32 |
| Aluminum trihydrate | 48.56 | 48.56 | 48.56 | 48.56 | 48.56 |
| Zinc Oxide | 2.22 | 2.22 | 2.22 | 2.22 | 2.22 |
| Sartomer SR 350 | 0.84 | 0.84 | 0.84 | 0.84 | 0.84 |
| Irganox ® 1010FF | 0.74 |  |  | 0.74 | 0.74 |
| Cyanox ® 1790 |  | 0.74 | 0.74 |  |  |
| Irganox ® 1024 FF |  |  |  |  |  |
| Naugard ® XL-1 | 0.50 | 0.50 |  | 0.50 |  |
| OABH |  |  | 0.50 |  | 0.50 |
| Vinytriethoxysilane | 0.59 | 0.59 | 0.59 | 0.59 | 0.59 |
| Seenox ® 412S |  | 1.48 | 1.48 | 1.48 | 1.48 |
| Cyanox ® STDP | 1.48 |  |  |  |  |

TABLE 2-continued

|  | Ex. 5 (47-2) | Ex. 6 (47-3) | Ex. 7 (47-4) | Ex. 8 (47-10) | Ex. 9 (47-13) |
|---|---|---|---|---|---|
| Zinc Stearate | 0.35 | 0.35 | 0.35 | 0.35 | 0.35 |
| VulCup R | 1.40 | 1.40 | 1.40 | 1.40 | 1.40 |
| Copper MB (1% Copper in EVA Copolymer) | 1.00 | 1.00 | 1.00 | 1.00 | 1.00 |
| Total | 100.00 | 100.00 | 100.00 |  | 100.00 |
| Tensile Elongation @ Break, % |  |  |  |  |  |
| Days in Oven @ 180° C. | 47-2 | 47-3 | 47-4 | 47-10 | 47-13 |
| 0 | 99 | 177 | 201 | 223 | 199 |
| 21 | 13 | 22 | 18 | 107 | 69 |
| Retained Tensile Elongation @ Break, % |  |  |  |  |  |
| Days in Oven @ 180° C. | 47-2 | 47-3 | 47-4 | 47-10 | 47-13 |
| 0 | 100 | 100 | 100 | 100 | 100 |
| 21 | 13 | 12 | 9 | 48 | 35 |
| Color Rating @ 180° C. |  |  |  |  |  |
| Days | 47-2 | 47-3 | 47-4 | 47-10 | 47-13 |
| 0 | 1 | 1 | 2 | 1 | 2 |
| 21 | 6 | 4 | 5 | 4 | 4 |

Color Rating Code

| Rating | 1 | 2 | 3 | 4 | 5 | 6 |
|---|---|---|---|---|---|---|
| Color | white | off-white | beige | dark beige | light brown | brown |

Examples 10-13

Formulations of Examples 10-13 are shown below in Table 3. These formulations without peroxide present were prepared in a batch compounding machine for 7 minutes from 110 to 150° C. The peroxide was then added to the batch prepared formulations via a two-roll mill set at about 100° C. The formulations were then granulated for the wire extrusion. The granulated formulations were fed into a 2.5" extruder (20:1 L:D) with a polyethylene metering screw and extruded onto a 18 AWG/7 strand bare copper wire with a wall thickness of 16 mils. The extruded wire was cured in a CV tube at about 200° C. with a residence time of 30 seconds. These samples were subjected to 10 days (240 hours) heat aging at 150° C. and 18 weeks (3000 hours) heat aging at 125° C. At the end of the testing period, the test samples were wound around a ¼" mandrel for three turns at the room temperature and then subjected to withstand voltage test at 1 kV in a 5 wt % salt water for 1 minute (a modified ISO 6722 test protocol). A comparison of Examples 11 and 12 shows that XL-1 (Example 11) is more effective metal deactivator than OABH (Example 12) in stabilizing polymer composition for heat resistance and color stability. After oven aging for 18 weeks (3000 hours) at 125° C., the Example 11 formulation had an off-white color, whereas the Example 12 formulation had a dark brown color. In addition, after oven aging for 18 weeks (3000 hours) at 125° C., the formulation of Example 11 passed the winding and withstanding voltage test at 1 kV described above, whereas the Example 12 formulation failed.

In the oven aging for 10 days (240 hours) at 150° C. testing, the Example 11 formulation had an off-white color and passed the winding and withstanding voltage test at 1 kV, whereas the Example 12 formulation had a dark brown color and failed the winding and withstanding voltage test at 1 kV.

Furthermore, a comparison of Examples 12 and 13 show that when a hindered amine light stabilizer (Chimassorb® 2020) was added into a formulation containing OABH, the heat resistance stability and color stability were improved significantly. In both the oven aging for 18 weeks (3000 hours) at 125° C. test and the oven aging for 10 days (240 hours) at 150° C. test, Example 13 (Chimassorb® 2020) was off-white and passed the winding and withstanding voltage test at 1 kV, whereas Example 12 (no Chimassorb® 2020) was dark brown and failed the winding and withstanding voltage test at 1 kV.

A comparison of Examples 10 and 11 shows that combination of XL-1, Irganox® 1010, and Seenox® 412S (Example 11) is more effective than the combination of XL-1, Cyanox® 1790 and Seenox® 412S (Example 10) in stabilizing the polymer. In the oven aging for 18 weeks (3000 hours) at 125° C. test, Example 11 was off-white and passed the winding and withstanding voltage test at 1 kV, whereas Example 10 was dark brown and failed the winding and withstanding voltage test at 1 kV. In the oven aging for 10 days (240 hours) at 150° C. test, Example 11 was off-white and passed the winding and withstanding voltage test at 1 kV, whereas Example 10 was white and passed the winding and withstanding voltage test at 1 kV.

TABLE 3

|  | Ex. 10 (48-2) | Ex. 11 (48-4) | Ex. 12 (48-5) | Ex. 13 (48-3) |
|---|---|---|---|---|
|  | Composition, wt % | | | |
| Components |  |  |  |  |
| EVA Copolymer (18% VA, 2.5 Ml) | 43.41 | 43.41 | 43.41 | 43.17 |
| Aluminum trihydrate | 48.56 | 48.56 | 48.56 | 48.56 |
| Zinc Oxide | 2.19 | 2.19 | 2.19 | 2.19 |

TABLE 3-continued

|  | Ex. 10 (48-2) | Ex. 11 (48-4) | Ex. 12 (48-5) | Ex. 13 (48-3) |
|---|---|---|---|---|
|  | Composition, wt % | | | |
| Sartomer SR 350 | 0.83 | 0.83 | 0.83 | 0.83 |
| Irganox ® 1010FF | 0.00 | 0.73 | 0.73 | 0.73 |
| Chimassorb ® 2020[1] | 0.00 | 0.00 | 0.00 | 0.25 |
| Cyanox ® 1790 | 0.73 | 0.00 | 0.00 | 0.00 |
| Naugard ® XL-1 | 0.49 | 0.49 | 0.00 | 0.00 |
| OABH | 0.00 | 0.00 | 0.49 | 0.49 |
| Vinytriethoxysilane | 0.58 | 0.58 | 0.58 | 0.58 |
| Seenox ® 412S | 1.46 | 1.46 | 1.46 | 1.46 |
| Cyanox ® STDP | 0.00 | 0.00 | 0.00 | 0.00 |
| Zinc Stearate | 0.35 | 0.35 | 0.35 | 0.35 |
| VulCup R | 1.40 | 1.40 | 1.40 | 1.40 |
| Total | 100 | 100 | 100 | 100 |
| Heat Resistance Test @ 125° C. | | | | |
| Initial Color | White | White | White | White |
| Oven aging for 18 weeks @ 125° C. | | | | |
| Color | Dark brown | Off-white | Dark brown | Off-white |
| Winding and withstand voltage test 1 kV | Fail | Pass | Fail | Pass |
| Heat Resistance Test @ 150° C. | | | | |
| Initial Color | White | White | White | White |
| Oven aging for 240 hours @ 150° C. | 100 | 100 | 100 |  |
| Color | White | Off-white | Dark Brown | Off-white |
| Winding and withstand voltage test @ 1 kV | Pass | Pass | Fail | Pass |

[1]Chimassorb ® 2020 is the reaction products of 1,6-hexanediamine, N,N'-bis(2,2,6,6-tetramethyl-4-piperidinyl)-polymer with 2,4,6-trichloro-1,3,5-triazine with N-butyl-1-butanamine and N-butyl-2,2,6,6-tetramethyl-4-piperidinamine (CAS 192268-64-7) and can be obtained from Ciba Specialty Chemicals, Tarrytown, NY.

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation lawfully accorded the appended claims.

What is claimed is:

1. A wire or cable comprising an insulation composition in contact with a copper conductor, the insulation composition characterized as comprising:
    a. an ethylene-vinyl acetate polymer;
    b. a metal deactivator selected from at least one of 2,2'-oxamido bis[ethyl 3-(3,5-di-tert-butyl-4-hydroxyphenyl)propionate] and oxalyl bis(benzylidenehydrazide);
    c. a primary antioxidant; and
    d. pentaerythritol tetrakis (B-laurylthiopropionate), wherein the insulation composition is crosslinked.

2. The wire or cable of claim 1, wherein the primary antioxidant comprises a hindered phenol antioxidant.

3. The wire or cable of claim 2, wherein the hindered phenol antioxidant comprises pentaerythrityl-tetrakis[3-(3,5-di-tert-butyl-4-hydroxyphenyl)propionate].

4. The wire or cable of claim 1, wherein the metal deactivator is included at 0.05 to 10 parts by weight per about 100 parts by weight of the polymer.

5. The wire or cable of claim 2, wherein the hindered phenol is included at 0.05 to 10 parts by weight per about 100 parts by weight of the polymer.

6. The wire or cable of claim 1, wherein the thiosynergist is included at 0.05 to 30 parts by weight per about 100 parts by weight of the polymer.

7. The wire or cable of claim 1, further comprising a light stabilizer that is included at 0.05 to 10 parts by weigh per about 100 parts by weight of the polymer.

8. The wire or cable of claim 7, wherein the light stabilizer is hindered amine light stabilizer.

9. The wire or cable of claim 8, wherein the light stabilizer comprises reaction products of 1,6-hexanediamine, N,N'-bis (2,2,6,6-tetramethyl-4-piperidinyl)-polymer with 2,4,6-trichloro-1,3,5-triazine with N-butyl-1-butanamine and N-butyl-2,2,6,6-tetramethyl-4-piperidinamine.

10. A method of making an insulated wire or cable, the method comprising:
    a. blending an ethylene-vinyl acetate polymer, a primary antioxidant, pentaerythritol tetrakis (B-laurylthiopropionate), and a metal deactivator selected from at least one of 2,2'-oxamido bis[ethyl 3-(3,5-di-tert-butyl-4-hydroxyphenyl) propionate] and oxalyl bis(benzylidenehydrazide) to form a composition;
    b. forming the composition into a desired shape around, and in contact with, a copper conductor; and
    c. crosslinking the composition.

11. The method of claim 10, wherein the forming comprises extruding the composition.

12. The method of claim 10, wherein the forming comprises molding the composition.

13. The method of claim 10, wherein the primary antioxidant comprises a hindered phenol antioxidant.

14. The method of claim 13, wherein the hindered phenol antioxidant comprises pentaerythrityl-tetrakis[3-(3,5-di-tert-butyl-4-hydroxyphenyl)propionate].

15. The method of claim 10, wherein the metal deactivator is included at 0.05 to 10 parts by weight per about 100 parts by weight of the polymer.

16. The method of claim 13, wherein the hindered phenol is included at 0.05 to 10 parts by weight per about 100 parts by weight of the polymer.

17. The method of claim 10, wherein the pentaerythritol tetrakis (B-laurylthiopropionate) is included at 0.5 to 30 parts by weight per 100 parts by weight of the polymer.

* * * * *